United States Patent [19]

Pawlak

[11] Patent Number: 5,661,666
[45] Date of Patent: Aug. 26, 1997

[54] CONSTANT FALSE PROBABILITY DATA FUSION SYSTEM

[75] Inventor: Robert J. Pawlak, Montross, Va.

[73] Assignee: The United States of America as represented by the Secretary of the Navy, Washington, D.C.

[21] Appl. No.: 972,339

[22] Filed: Nov. 6, 1992

[51] Int. Cl.⁶ .................................................. G06F 17/00
[52] U.S. Cl. ........................................................ 364/571.07
[58] Field of Search ........................... 364/516, 571.01, 364/571.07, 715.06

[56] References Cited

U.S. PATENT DOCUMENTS

| | | | |
|---|---|---|---|
| 4,012,627 | 3/1977 | Antoniak | 364/715.06 |
| 4,013,998 | 3/1977 | Bucciarelli et al. | 340/146.2 |
| 4,122,521 | 10/1978 | Rick et al. | 364/424 |
| 4,159,477 | 6/1979 | Le Beyec | 343/7 A |
| 4,231,005 | 10/1980 | Taylor, Jr. | 342/194 |
| 4,293,856 | 10/1981 | Chressanthis et al. | 342/93 |
| 4,852,056 | 7/1989 | Rogers et al. | 364/581 |
| 4,860,216 | 8/1989 | Linsenmayer | 364/516 |
| 4,970,660 | 11/1990 | Marchant | 364/517 |

*Primary Examiner*—James P. Trammell
*Assistant Examiner*—Edward J. Pipala
*Attorney, Agent, or Firm*—James B. Bechtel, Esq.

[57] ABSTRACT

A system for determining whether a given phenomenon has occurred based on multiple sensor decisions is provided. Each sensor samples input data and attempts to decide if the given phenomenon exists. These sensor decisions are provided to the data fusion processor. The data fusion processor uses a sum of the sensor decisions multiplied by a logarithmic gain indicating the relative reliability of each sensor to generate a test existence metric. The test existence metric is compared to two threshold limits. The results of this comparison are used to provide a final decision indicating the existence of the given phenomenon. An optimization is used to determine the threshold values used in the threshold table to guarantee that the false alarm rate and the data fusion processor is constant, even in cases where data from some sensor is missing.

8 Claims, 2 Drawing Sheets

CONSTANT FALSE PROBABILITY DATA FUSION SYSTEM

The invention described herein was made in the performance of official duties by an employee of the Department of the Navy and may be manufactured, used, licensed by or for the Government for any governmental purpose without payment of any royalties thereon.

FIELD OF THE INVENTION

The present invention relates generally to signal processors and, in particular, to data fusion processors.

BACKGROUND OF THE INVENTION

Systems for detecting the existence of a given phenomenon, for example a radar target, have long been operated in an environment where the performance of the signal processor is limited by noise within the environment which results in false alarms from the signal processor. It has thus been of utmost importance to maintain a constant false alarm rate in signal processors.

Several implementations of signal processors with constant false alarm rates exist in the prior art; however, these implementations have required that all available sensor inputs must provide data to the signal processor in order to maintain a constant false alarm probability for the system. The failure of any sensor to report data to the signal processor will result in a varying probability of false alarm, thus degrading the performance of either an automated detection system or a human operator.

Furthermore, some implementations in the prior art have required that the sensor provide all input data to the fusion processor instead of a sensor decision on the existence of the test phenomenon. In these cases, the fusion processor is often overloaded with complex calculations which impact on the operating speed of the system.

Accordingly, it is an object of the present invention to provide a data fusion system for determining whether a test phenomenon has occurred based on multiple sensor decisions.

It is a further object of the present invention to provide a data fusion system having a constant probability of false alarm while maintaining a maximum probability of detection.

A still further object of the present invention is to provide a data fusion system having robust operation when the reliability of any sensor deviates from its expected value.

It is a further object of the present invention to provide a data fusion system wherein only sensor decisions are presented to the fusion processor.

It is yet a further object of the present invention to provide a data fusion system having the capability of processing missing sensor decisions while maintaining a constant probability of false alarm.

A further object of the present invention is to provide a data fusion system having fast, real-time operation.

SUMMARY OF THE INVENTION

In accordance with the present invention, a complete system for processing sensor decisions and generating a final decision on the existence of the test phenomenon is provided. This system includes multiple sensors providing decisions which indicate the existence or non-existence of a test phenomenon. These decisions are weighted using a log-likelihood ratio based on the reliability of each sensor. This weighted value is compared to two threshold values to yield a final system decision indicating the existence of the test phenomenon or a requirement that an additional set of sensor measurements be taken.

BRIEF DESCRIPTION OF THE DRAWINGS

The numerous advantages of the present invention will be more fully appreciated from the detailed description when read with reference to the appended drawings wherein.

DETAILED DESCRIPTION OF THE INVENTION

Figure 1:
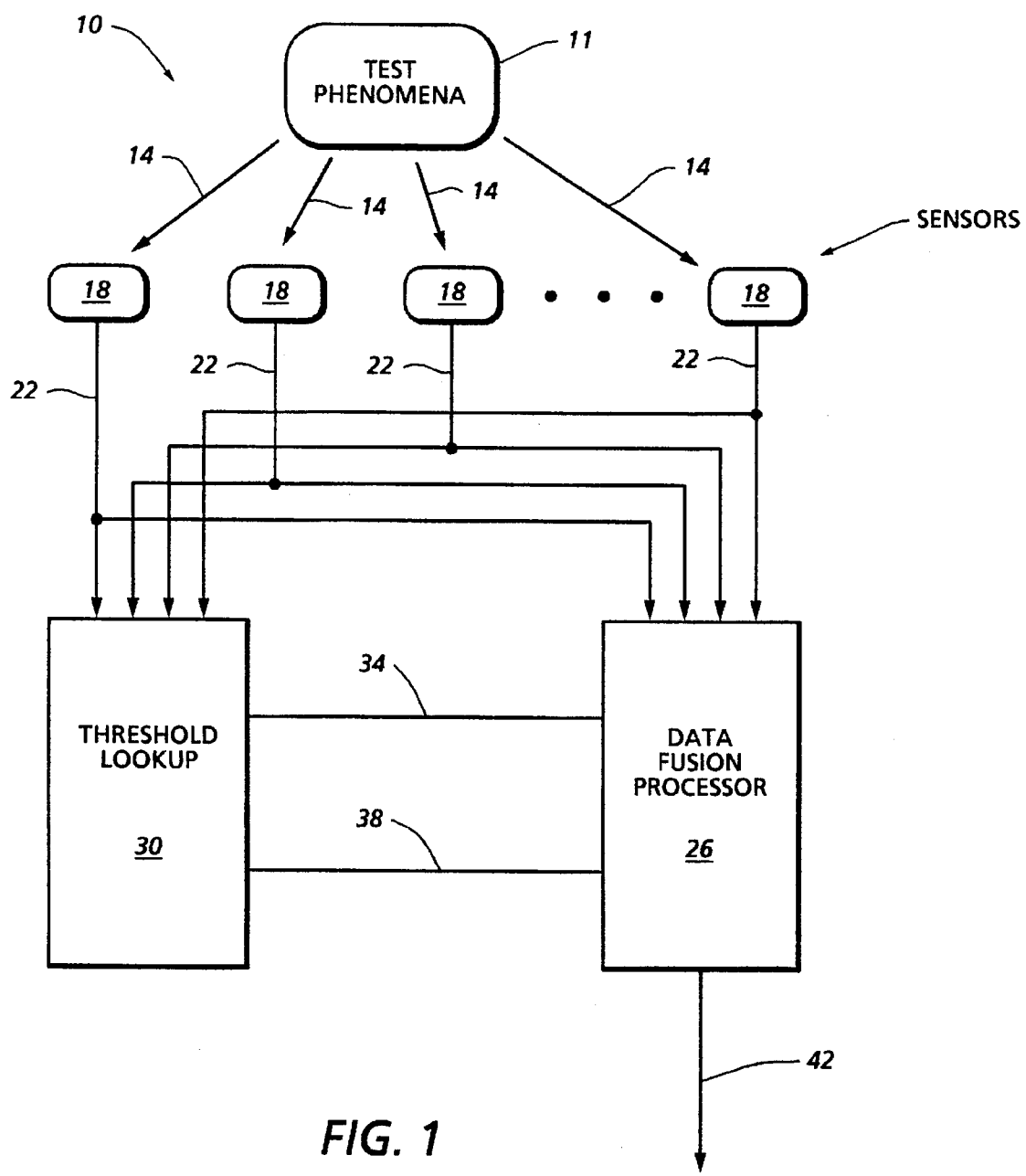
FIG. 1 is a high level drawing of the entire data fusion processor system.

Referring now to the drawings, and in particular to FIG. 1, one embodiment of the data fusion processor system 10 is diagrammed. The input sensors 18 receive multiple data 14 along plural paths as shown indicating the presence of the test phenomenon 11 in an environment under surveillance. This data is used at the sensor level to provide a sensor decision 22 indicative of the existence of the test phenomenon 11 to the data fusion processor 26 and the threshold lookup table 30 from all sensors 18. The threshold lookup table 30 provides two thresholds, represented by a first threshold value 38 and a second threshold value 34 to the data fusion processor 26. The data fusion processor 26 uses the sensor decisions 22 to generate a log-likelihood ratio. The log-likelihood is used as a test existence metric. The log-likelihood ratio is then compared to the two threshold values provided by the threshold lookup table 30. If the log-likelihood ratio is greater than the first threshold value 38, then a final decision indicating that the test phenomenon 11 is present is provided. If the log-likelihood ratio is less than the second threshold value 34, then a final decision 42 indicating that the test phenomenon 11 is not present is provided. In other cases, where the log-likelihood ratio falls between the two thresholds, the data fusion processor 26 can either provide a final decision 42 indicating that it can not determine the existence of the test phenomenon 11 or the final decision 42 can be deferred until the next measurement cycle.

Figure 2:
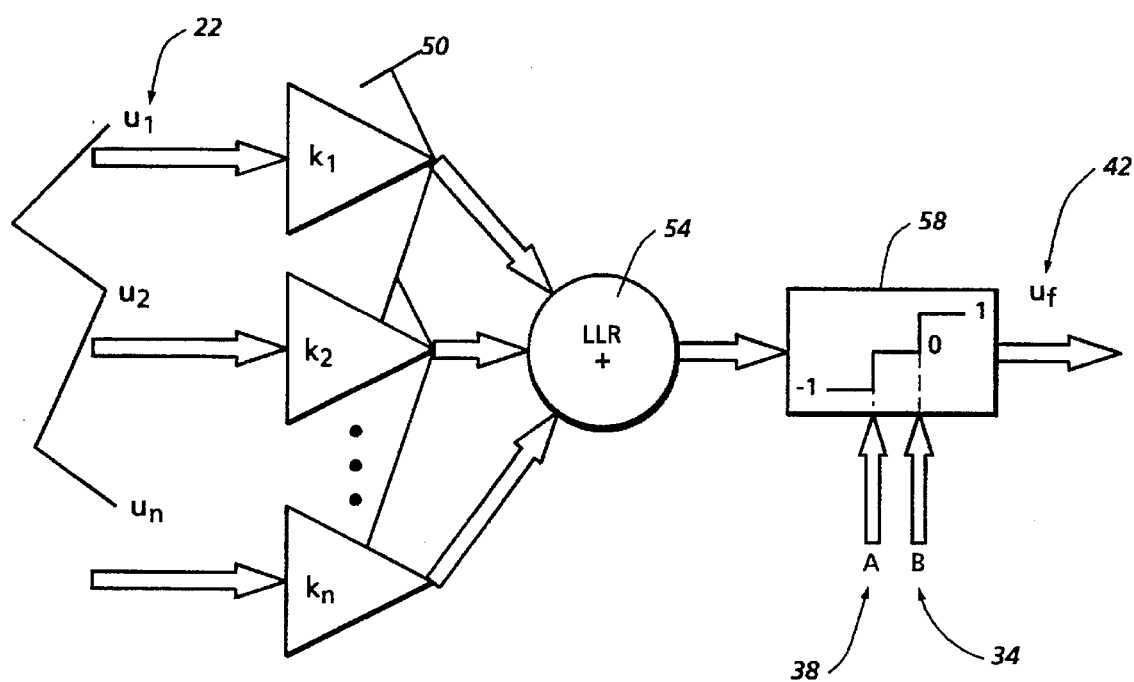
FIG. 2 is a block diagram of the data fusion processor.

Referring now to FIG. 2, the log-likelihood ratio computation in the data fusion processor is shown in greater detail. The sensor decisions 22 are each multiplied by a logarithmic gain at multiplier 50 to indicate the relative reliability of each sensor providing the sensor decision 22. The value of such gain is given by the following equations:

*if $u_i = 1$ $k_i = \log((1 - P_{Mi})/P_{Fi})$
*if $u_i = 0$ $k_i = 0$
*if $u_i = -1$ $k_i = \log((1 - P_{Fi})/P_{Mi})$ In these equations, $u_i$ indicates the sensor decision 22 provided by the $i^{th}$ sensor, and $k_i$ is the logarithmic gain 50. $P_{Mi}$ is the probability of a miss for the $i^{th}$ sensor, and $P_{Fi}$ is the probability of a false alarm for the $i^{th}$ sensor. The sensor decisions 22 provided by the signal processors have three values; a value of one indicates a positive "pass" sensor test for the test phenomenon 11, a value of negative one indicates a negative "fail" sensor test for the test phenomenon 11, and a value of zero indicates either no sensor decision or a missing sensor decision.

Within the data fusion processor, sums all of the sensor decisions 22 multiplied by the logarithmic gain multiplier 50 are processed at 54 to generate the log-likelihood ratio. The log-likelihood ratio from 54 is then used in the comparison tests 58 to generate the final decision 42.

The threshold lookup table values performed at 38 and 34 used in the comparison tests at 58 may be computed either one time only or periodically during system operation. If the threshold lookup table value is recomputed periodically during system operation, the system becomes more adaptive to changes in the probabilities of false alarm and detection at each sensor; however, this will incur a system performance degradation due to the processing overhead of recomputing the table. For fast, real-time measurements, the one time computation of the threshold lookup table provides minimal recomputation delays and relatively robust handling of changes in the reliabilities of the sensors.

The following variables are used in the computation of the threshold lookup table:

* $j$ denotes a given subset of sensors with data,
* $i$ denotes data for the $i^{th}$ sensor,
* $A_j$ denotes the first threshold value 38 for a given subset of sensors with data,
* $B_j$ denotes the second threshold value 34 for a given subset of sensors with data,
* $P_{Di}$ denotes the probability of detection for the $i^{th}$ sensor,
* $P_{Fi}$ denotes the probability of false alarm for the $i^{th}$ sensor,
* $a_{i,j}$ equal to $P_{Di}$,
* $b_{i,j}$ equal to $1-P_{Di}$,
* $f_{i,j}$ equal to $P_{Fi}$,
* $g_{i,j}$ equal to $1-P_{Fi}$,
* $c_i$ equal to $\log((1-P_{Di})/(1-P_{Fi}))$,
* $d_i$ equal to $\log (P_{Di}/P_{Fi})$,
* $H_a$ denotes hypothesis "a", $H_0$ indicates the test phenomenon is not present and $H_1$ indicates that the test phenomenon is present,
* $RFO_{j,Ha}$ denotes the relative frequency of occurrence of data set $j$ given that hypothesis $H_a$ is true,
* $\psi_{j,Ha}(q)$ denotes the $q_{th}$ term of the ordered multinominal that describes the amplitude distribution of the log-likelihood ratio at the data fusion processor for hypothesis $H_a$ and data set $j$. This amplitude distribution is composed of all the tuples $f_{i,j}$ and $g_{i,j}$ for hypothesis $H_0$, and is composed of all the tuples $a_{i,j}$ and $b_{i,j}$ for hypothesis $H_1$,
* $\Phi_j(q)$ denotes the $q^{th}$ term of the sum of all the tuples of $c_i$ and $d_i$ that describe the location of the amplitudes given by $\psi_{j,Ha}(q)$, and
* $U(x)$ denotes the unit step or indicator function.

The actual computation of the threshold lookup table is a combinatorial optimization subject to the following constraints:

1. Some data combinations may be ignored, but this will result in a degradation of the objective function of the optimization.
2. The false alarm probability of the entire data fusion processor 26 should be held constant and is given by the following equation:

$$P_{Ffus} = \sum_j RFO_{j,H0} \sum_{q \in Q} \psi_{j,H0}(q) U(\Phi_j(q) - A_j)$$

3. The probability of detection for the data fusion processor 26 should be maximized and is given by the following equation:

$$P_{Dfus} = \sum_j RFO_{j,H1} \sum_q \psi_{j,H1}(q) U(\Phi_j(q) - A_j)$$

4. The probability of requesting another measurement on the basis of noise for the data fusion processor 26 should be held constant and is given by the following equation:

$$P_{RFMfus} = \sum_j RFO_{j,H0} \sum_q \psi_{j,H0}(q)(U(\Phi_j(q) - B_j) - U(\Phi_j(q) - A_j))$$

5. The probability of detection based on the request for another measurement for the data fusion processor 26 should be maximized and is given by the following equation:

$$P_{RDMfus} = \sum_j RFO_{j,H1} \sum_q \psi_{j,H1}(q)(U(\Phi_j(q) - B_j) - U(\Phi_j(q) - A_j))$$

6. The relative frequency of occurrence data (RFO) values should be augmented by a small positive number if they are zero to improve sensitivity to changes in the RFO values during operation.
7. The first threshold value 38 should be greater than or equal to the second threshold value 34 for all cases.

$$B_j \leq A_j$$

The sensor decisions 22 provided by the sensors 18 are passed to the threshold lookup table 30. Based on which sensor decisions 22 are missing, an appropriate $j$ index is selected. The values $A_j$ and $B_j$ are then passed to the data fusion processor 26 as the first 38 and second 34 threshold value.

The advantages of the present invention are numerous. The data fusion system processor which requires only decisions from the sensors, thus limiting the required bandwidth between the sensor and the processor. This architecture also allows the majority of the sensor data processing to be distributed to the remote sensors, allowing the data fusion processor to function in a fast, real-time manner. The data fusion processor uses a unique lookup table for sensor thresholds which allows the processor to provide a constant probability of false alarm, even when one or more sensor decisions are missing. Furthermore, the base combinatorial optimization allows the data fusion processor to handle deviations from the expected sensor reliability without adverse impact to system performance, even when the threshold lookup table is computed only once. When the threshold lookup table is recomputed periodically, the data fusion processor is able to adapt to changing sensor reliabilities.

Although the invention has been described relative to a specific embodiment thereof, there are numerous variations and modifications that will be readily apparent to those skilled in the art in the light of the above teachings. It is therefore to be understood that, within the scope of the appended claims, the invention may be practiced other than as specifically described.

What is claimed as new and desired to be secured by Letters Patent of the United States is:

1. In a system for determining presence of a test phenomenon within an environment being monitored including: a plurality of sensors receiving input data to produce outputs representative of said environment;

data fusion processor means for generating a weighted decision value from the input data based on relative reliability of said sensors; means for generating a look-up table from which thresholds are selected based on said weighted decision value; means for multiplying said outputs of the sensors to determine said relative reliability of the sensors; processing means for summing the outputs in sequence with said multiplying thereof; and comparator means rendered operative in response to said selected thresholds for generating a final decision reflecting said presence of the test phenomenon from the outputs of the sensors after said multiplying and summing thereof in sequence.

2. A system for determining the presence of the test phenomenon as in claim 1 wherein said plurality of sensors comprise an array of radar sensors.

3. A system for determining the existence of the test phenomenon as in claim 1 wherein said means for generating the lookup table is a combinatorial optimization algorithm with the following constraints: probability of false alarm for said system is held constant; probability of detection for said system is maximized; probability of requesting additional measurements based on noise for said system is held constant; and probability of detection based on the additional requested measurements for said system is maximized.

4. A system for determining the existence of the test phenomenon as in claim 1 wherein said means for generating a threshold lookup table is performed one time only thereby providing increased speed for data fusion.

5. A system for determining the existence of the test phenomenon as in claim 1 wherein said means for generating a threshold lookup table is performed periodically thereby providing adaptivity to variations in sensor performance.

6. A system for determining the existence of the test phenomenon as in claim 1 wherein said means for generating the threshold values from said weighted decision values is given by using a vector U to compute an index.

7. In a system for determining presence of a test phenomenon within an environment being monitored including: a plurality of sensors receiving input data to produce outputs representative of said environment; weighting means for generating thresholds based on relative reliability of the sensors; means for multiplying said outputs of the sensors to determine said relative reliability of the sensors; processing means for summing the outputs in sequence with said multiplying thereof; comparator means rendered operative in response to said thresholds for generating a final decision reflecting said presence of the test phenomenon from the outputs of the sensors after said multiplying and summing thereof in sequence.

8. In a system for determining presence of a test phenomenon within an environment being monitored by a plurality of sensors receiving input data to produce outputs representative of said environment, a method including the steps of: computing a look-up table from a collection of the outputs from the sensors; limiting said collection of the outputs to probabilities of false alarm and remeasurement because of noise maintained at constant rates; further limiting said collection of the outputs to maximize detection of the test phenomenon and said remeasurement; computing thresholds from the look-up table selected from two values, one of which is equal to or greater than the other; multiplying said outputs of the sensors to determine relative reliability of the sensors; summing the multiplied outputs in sequence; and utilizing the computed thresholds to generate a final decision reflecting said presence of the test phenomenon.

* * * * *